United States Patent
Chuang

(10) Patent No.: US 8,063,891 B2
(45) Date of Patent: *Nov. 22, 2011

(54) TOUCH PAD AND METHOD FOR REGULATING SENSITIVITY OF THE TOUCH PAD

(75) Inventor: Tsung-Jen Chuang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1005 days.

This patent is subject to a terminal disclaimer.

(21) Appl. No.: 11/960,717

(22) Filed: Dec. 20, 2007

(65) Prior Publication Data
US 2009/0101416 A1  Apr. 23, 2009

(30) Foreign Application Priority Data
Oct. 17, 2007 (CN) .......................... 2007 1 0202105

(51) Int. Cl.
  G06F 3/041 (2006.01)
  G06K 11/06 (2006.01)
  G08C 21/00 (2006.01)
(52) U.S. Cl. .................. 345/173; 178/18.01; 178/18.03; 178/20.01
(58) Field of Classification Search .... 178/18.01–18.11, 178/20.01–20.04; 345/173–178
See application file for complete search history.

(56) References Cited

U.S. PATENT DOCUMENTS

| | | | |
|---|---|---|---|
| 6,043,810 A * | 3/2000 | Kim et al. ...................... | 345/173 |
| 6,262,717 B1 | 7/2001 | Donohue et al. | |
| 6,535,147 B1 * | 3/2003 | Masters et al. .................. | 341/34 |
| 7,948,478 B2 * | 5/2011 | Chuang .......................... | 345/173 |
| 2004/0183787 A1 * | 9/2004 | Geaghan et al. .............. | 345/173 |
| 2006/0017701 A1 | 1/2006 | Marten et al. | |
| 2006/0146038 A1 * | 7/2006 | Park et al. ...................... | 345/173 |
| 2007/0152977 A1 | 7/2007 | Ng et al. | |
| 2008/0252613 A1 * | 10/2008 | Chuang .......................... | 345/174 |

* cited by examiner

*Primary Examiner* — Bipin Shalwala
*Assistant Examiner* — Ilana Spar
(74) *Attorney, Agent, or Firm* — Altis Law Group, Inc.

(57) ABSTRACT

A touch pad includes a touch sensor, a touch detection unit, an atmospheric pressure detection unit, and an atmospheric pressure compensation unit. The touch sensor detects a touch input from users, and generates analog signals. The touch detection unit amplifies the analog signals by a controllable gain to generate amplified analog signals, converts the amplified analog signals to digital signals, and sends the digital signals to the processor to determine a touch location. The atmospheric pressure detection unit measures ambient atmospheric pressure, and generates an atmospheric pressure level. The atmospheric pressure compensation unit generates a gain regulation signal corresponding to the atmospheric pressure level to control the touch detection unit to regulate the controllable gain. A related method for regulating sensitivity of the touch pad is also provided.

14 Claims, 4 Drawing Sheets

TOUCH PAD AND METHOD FOR REGULATING SENSITIVITY OF THE TOUCH PAD

BACKGROUND OF THE INVENTION

1. Field of the Invention

The present invention relates to input devices, and especially to a touch pad and a method for regulating sensitivity of the touch pad.

2. Description of Related Art

Touch pads are becoming increasingly popular because of their ease of use, versatility, and low price. A touch pad is often incorporated in electronic devices, such as portable computers, and used as a pointing. The touch pad allows a user to make selections and move a cursor by simply touching an input surface of the touch pad with a finger or a stylus. The touch pad is connected to a processor via a communication link. In general, the touch pad recognizes a location of the touch on the input surface and sends a signal to the processor. The processor performs actions to accept the selections or move the cursor based on the signal. They are different types of touch pads, such as capacitive touch pads, resistive touch pads, surface acoustic wave touch pads, infrared touch pads, etc.

However, changes in atmospheric pressure can affect sensitivity of the touch pad, thus reducing a stability of the touch pad. Take the capacitive touch pad for example, the capacitive touch pad comprises of rows of a first set of conductive traces, and of columns of a second set of conductive traces, and a dielectric insulator. The first set of conductive traces and the second set of conductive traces are insulated by the dielectric insulator to form a grid with an array of capacitors. When a point on the touch pad is touched, the capacitance of the capacitors at that point changes. A subsequent circuit then generates a signal according to the change of capacitance, and the signal can be used to identify the point.

As atmospheric pressure changes, the conductivity of the human body changes. As atmospheric pressure reduces, a coupling capacitance between the human body and the touch pad decreases, and the sensitivity of the touch pad decreases. Similarly, as atmospheric pressure increases, the coupling capacitance between the human body and the touch pad increases, therefore the sensitivity of the touch pad increases. Thus, changes in atmospheric pressure may affect the stability of the touch pad.

Therefore, a touch pad and a method for regulating sensitivity of the touch pad are desired.

SUMMARY OF THE INVENTION

A touch pad includes a touch sensor, a touch detection unit, an atmospheric pressure detection unit, and an atmospheric pressure compensation unit. The touch sensor detects a touch input from users, and generates analog signals. The touch detection unit amplifies the analog signals by a controllable gain to generate amplified analog signals, converts the amplified analog signals to digital signals, and sends the digital signals to a processor. The atmospheric pressure detection unit measures ambient atmospheric pressure, and generates an atmospheric pressure level. The atmospheric pressure compensation unit generates a gain regulation signal corresponding to the atmospheric pressure level to control the touch detection unit to regulate the controllable gain. A related method for regulating sensitivity of the touch pad is also provided.

Other advantages and novel features will become more apparent from the following detailed description of preferred embodiments when taken in conjunction with the accompanying drawings.

DETAILED DESCRIPTION OF THE INVENTION

The present features and functions involve in regulating the sensitivity of a touch pad which can be incorporated in electronic devices, such as a computer and a touch screen. The following detailed descriptions of exemplary and preferred embodiments are made with reference to the attached drawings, in detail.

Figure 1:
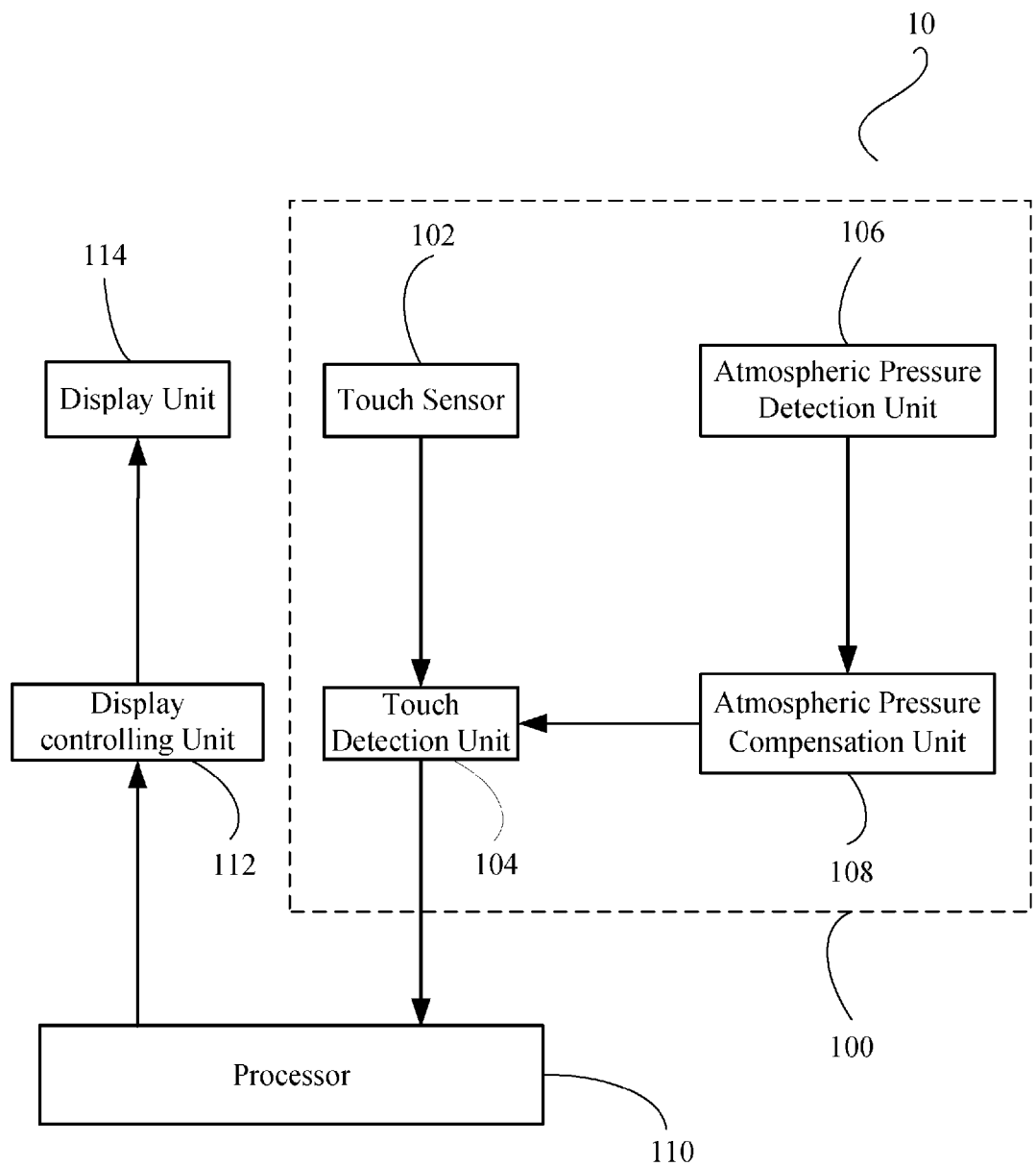
FIG. 1 is a block diagram of hardware infrastructure of an electronic device of the present invention.

Referring to FIG. 1, an electronic device 10 includes a touch pad 100, a processor 110, a display controlling unit 112, and a display unit 114. The touch pad 100 is used for receiving a touch input from users, thus generating corresponding analog signals. The processor 110 processes the analog signals, thus generating corresponding information.

The touch controlling unit 112 receives the information sent by the processor 110, and drives the display unit 114 to display corresponding data images, such as text information, multimedia information, operation interface, and so on.

The display unit 114 is configured for displaying data images and can be a liquid crystal display (LCD), a light emitting diode (LED), or a cathode ray tube (CRT), etc.

The touch pad 100 includes a touch sensor 102, a touch detection unit 104, an atmospheric pressure detection unit 106, and an atmospheric pressure compensation unit 108.

The touch sensor 102 detects the touch input, generates analog signals according to the touch input, and sends the analog signals to the touch detection unit 104.

The touch detection unit 104 amplifies the analog signal by a controllable gain to generate amplified analog signals, converts the amplified analog signals to digital signals, and sends the digital signals to the processor 110. When the electronic device 10 is powered on, if the atmospheric pressure is within a normal range, the controllable gain is set to an initial gain.

The processor 110 receives the digital signal sent by the touch detection unit 104, and determines a touch location according to the digital signal.

The atmospheric pressure detection unit 106 measures ambient atmospheric pressure, generates an atmospheric pressure level of the ambient atmospheric pressure, and sends the atmospheric pressure level to the atmospheric pressure compensation unit 108. The atmospheric pressure detection unit 106 can be the MPXA4115A6U atmospheric pressure sensor made by Freescale.

The atmospheric pressure compensation unit 108 generates a gain regulation signal according to the atmospheric pressure level, and sends the gain regulation signal to the touch detection unit 104. The gain regulation signal is used for controlling the touch detection unit 104 to regulate the controllable gain.

Figure 2:
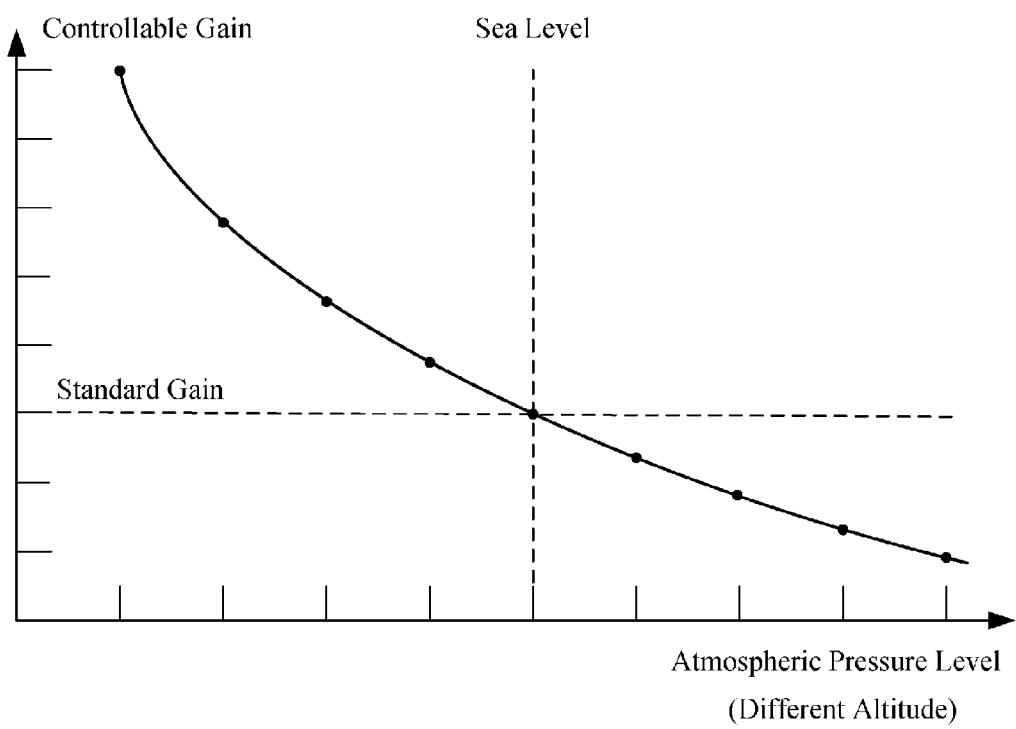
FIG. 2 is a linear function diagram showing a relationship between a predetermined gain and an atmospheric pressure level.

Referring to FIG. 2, the atmospheric pressure at sea level corresponds to a standard gain. At high altitudes, the atmospheric pressure is relatively low, thus the sensitivity of the touch pad 100 is low. Therefore, the controllable gain of the touch detection unit 104 needs to be increased when the atmospheric pressure is low. On the contrary, at low altitude, the atmospheric pressure is relatively high, thus the sensitivity of the touch pad 100 is high. Therefore, the controllable gain of the touch detection unit 104 needs to be reduced when the atmospheric pressure is high. The atmospheric pressure compensation unit 108 regulates the controllable gain of the touch detection unit 104 according to the atmospheric pressure level, thus the stability of the touch pad 100 is enhanced.

Figure 3:
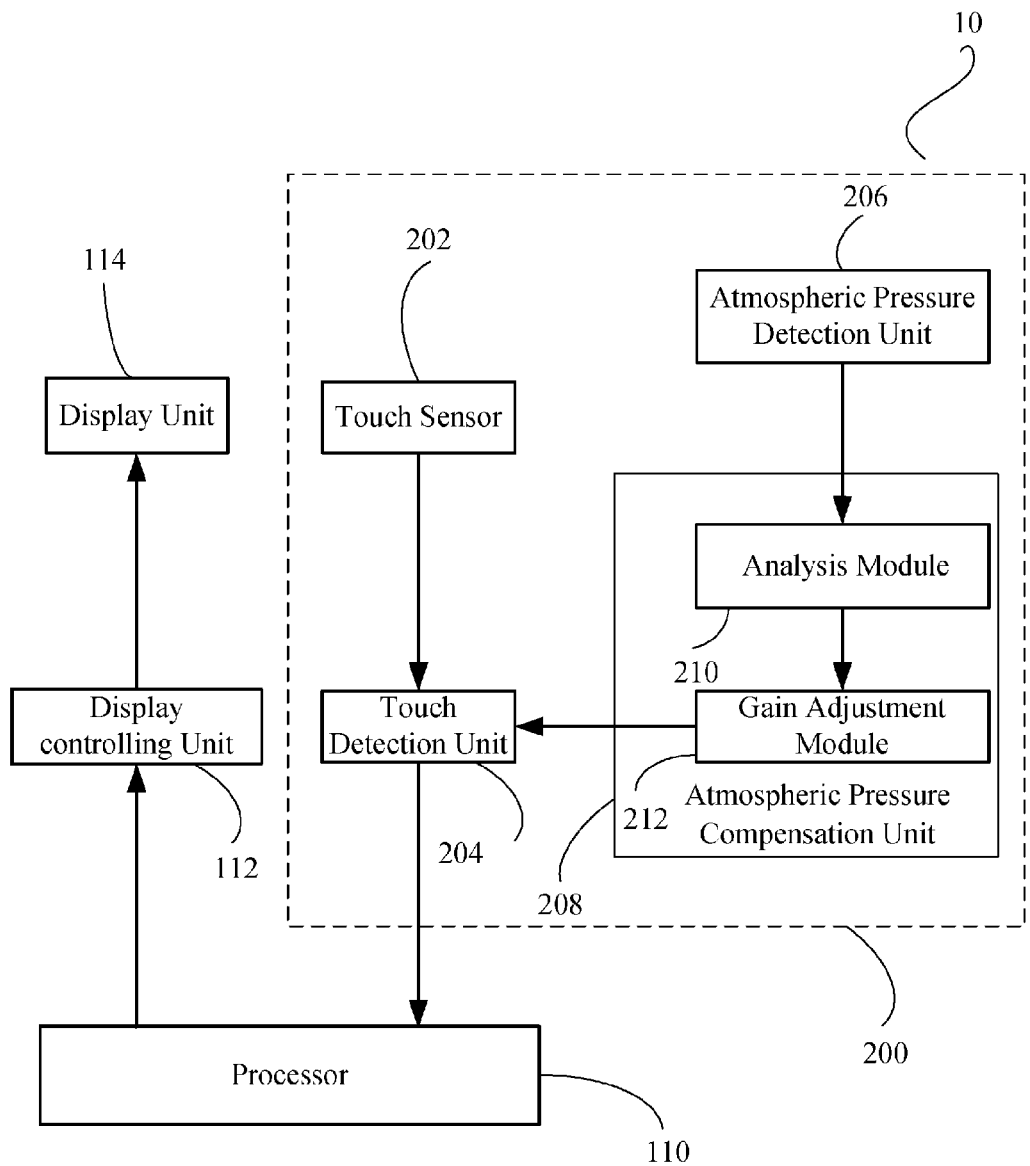
FIG. 3 is a block diagram of hardware infrastructure of a touch pad in accordance with an exemplary embodiment.

Referring to FIG. 3, the touch pad 200 includes a touch sensor 202, a touch detection unit 204, an atmospheric pressure detection unit 206, and an atmospheric pressure compensation unit 208 in accordance with an exemplary embodiment. The atmospheric pressure compensation unit 208 includes an analysis module 210 and a gain adjustment module 212. The touch sensor 202, the touch detection unit 204, and the atmospheric pressure detection unit 206 respectively perform the same function as the touch sensor 102, the touch detection unit 104, and the atmospheric pressure detection unit 106 in FIG. 1.

The analysis module 210 receives the atmospheric pressure level generated by the atmospheric pressure detection unit 206, and compares the atmospheric pressure level with a high threshold. If the atmospheric pressure level is higher than the high threshold, the gain adjustment module 212 generates a first gain regulation signal to decrease the controllable gain of the touch detection unit 204. On the contrary, if the atmospheric pressure level is lower than or equal to the high threshold, the analysis module 210 compares the atmospheric pressure level with a low threshold.

If the atmospheric pressure level is lower than the low threshold, the gain adjustment module 212 generates a second gain regulation signal to increase the controllable gain of the touch detection unit 204. If the atmospheric pressure level is higher than the low threshold, the gain adjustment module 212 generates a third gain regulation signal to control the touch detection unit 204 to adjust the controllable gain to the initial gain. Thus the touch detection unit 204 amplifies the analog signals by the initial gain. The high threshold and the low threshold are adjustable. For example, the high threshold and the low threshold can be preconfigured by user.

Figure 4:
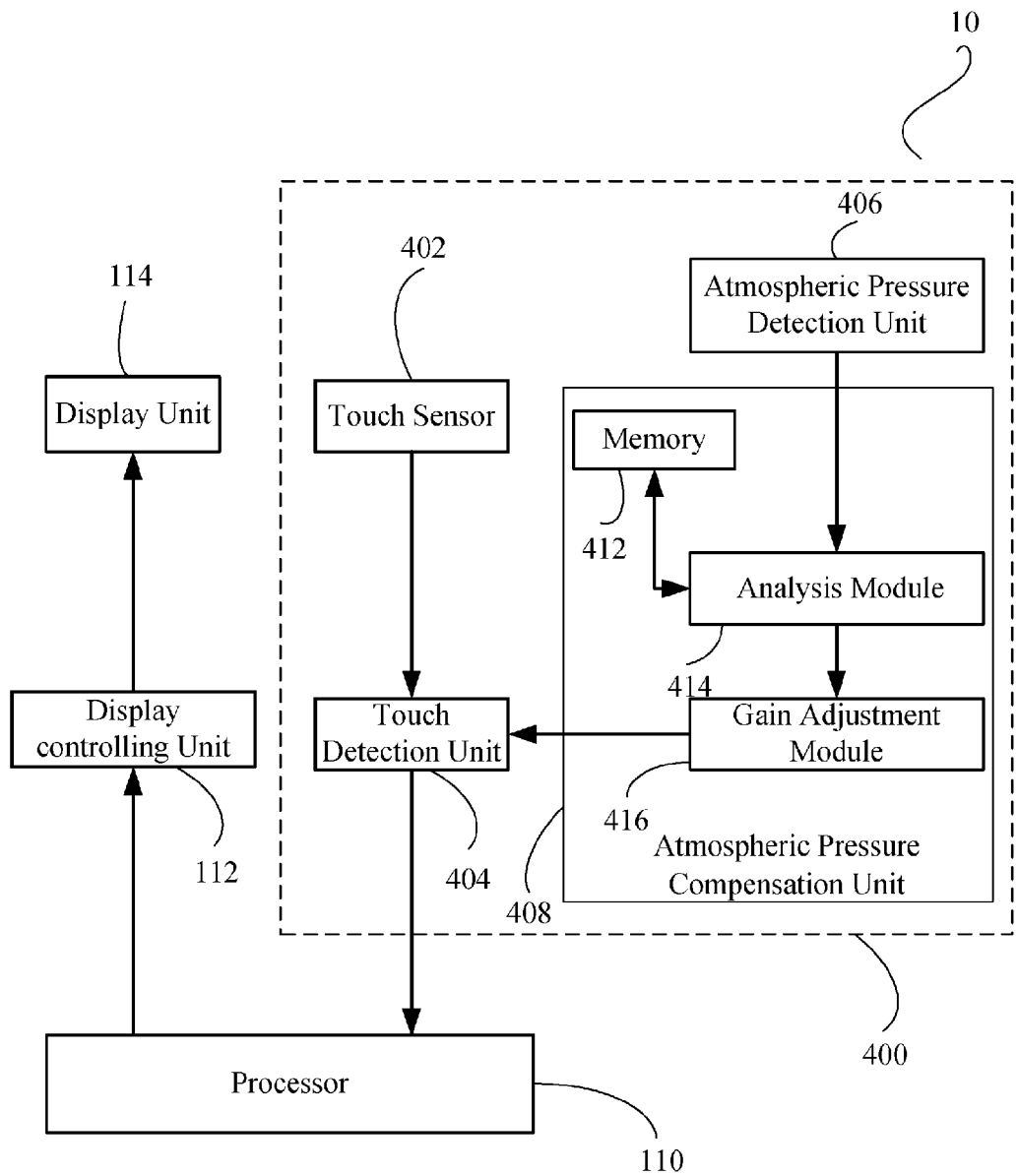
FIG. 4 is a block diagram of hardware infrastructure of the touch pad in accordance with an alternative embodiment.

Referring to FIG. 4, the touch pad 400 includes a touch sensor 402, a touch detection unit 404, an atmospheric pressure detection unit 406, and an atmospheric pressure compensation unit 408 in accordance with an alternative embodiment. The atmospheric pressure compensation unit 408 includes a memory 412, an analysis module 414, and a gain adjustment module 416. The touch sensor 402, the touch detection unit 404, and the atmospheric pressure detection unit 406 perform the same function as the touch sensor 102, the touch detection unit 104, and the atmospheric pressure detection unit 106 in FIG. 1 respectively.

The memory 412 stores a plurality of gain values corresponding to different atmospheric pressure levels. The analysis module 414 receives an atmospheric pressure level generated by the atmospheric pressure detection unit 406, and searches the memory 412 to obtain a gain value corresponding to the atmospheric pressure level. The gain adjustable module 416 generates the gain regulation signal to control the touch detection unit 404 to adjust the controllable gain to the obtained gain value. Thus the touch detection unit 404 amplifies the analog signals by the gain value.

It is understood that the invention may be embodied in various other forms without departing from the spirit thereof. Thus, the present examples and embodiments are to be considered in all respects as illustrative and not restrictive, and the invention is not to be limited to the details given above.

What is claimed is:

1. A touch pad comprising:
    a touch sensor configured for detecting a touch input, and generating analog signals;
    a touch detection unit configured for amplifying the analog signals by a controllable gain to generate amplified analog signals, converting the amplified analog signals to digital signals;
    an atmospheric pressure detection unit configured for measuring ambient atmospheric pressure, and generating an atmospheric pressure level;
    an atmospheric pressure compensation unit configured for generating a gain regulation signal corresponding to the atmospheric pressure level to control the touch detection unit to regulate the controllable gain.

2. The touch pad as claimed in claim 1, wherein the atmospheric pressure compensation unit comprises an analysis module and a gain adjustment module, the analysis module receives the atmospheric pressure level and compares the atmospheric pressure level with a high threshold, if the atmospheric pressure level is higher than the high threshold, the gain adjustment module sends the gain regulation signal to decrease the controllable gain of the touch detection unit.

3. The touch pad as claimed in claim 2, wherein an initial gain of the controllable gain is defined when the ambient atmospheric pressure is within normal range.

4. The touch pad as claimed in claim 3, wherein if the atmospheric pressure level is lower than or equal to the high threshold, the analysis module compares the atmospheric pressure level with a low threshold, if the atmospheric pressure level is lower than the low threshold, the gain adjustment module sends the gain regulation signal to increase the controllable gain of the touch detection unit.

5. The touch pad as claimed in claim 4, wherein if the atmospheric pressure level is higher than the low threshold, the gain adjustment module sends the gain regulation signal to adjust the controllable gain of the touch detection unit to the initial gain.

6. The touch pad as claimed in claim 5, wherein the high threshold and the low threshold is adjustable.

7. The touch pad as claimed in claim 1, wherein the atmospheric pressure compensation unit comprises a memory, the memory stores a plurality of gain values corresponding to different atmospheric pressure level.

8. The touch pad as claimed in claim 7, wherein the atmospheric pressure compensation unit comprises an analysis module and a gain adjustment module, the analysis module receives the atmospheric pressure level, searches the memory to obtain a gain value corresponding to the atmospheric pressure level, and sends the gain value to the gain adjustable module, the gain adjustable module sends the gain regulation signal to adjust the controllable gain of the touch detection unit to the gain value.

9. A method for regulating the sensitivity of a touch pad, the method comprises the steps of:
    receiving analog signals generated by the touch pad;
    amplifying the analog signals by a controllable gain to generate amplified analog signals;
    measuring ambient atmospheric pressure, and generating an atmospheric pressure level;

generating a gain regulation signal corresponding to the atmospheric pressure level, and regulating the controllable gain according to the gain regulation signal;

converting the amplified analog signals to the digital signals;

determining the touch location according to the digital signals.

10. The method as claimed in claim 9, wherein said step of generating the gain regulation signal comprises the sub-steps of:

comparing the atmospheric pressure level with a high threshold, and generating a first gain regulation signal for decreasing the controllable gain if the atmospheric pressure level is higher than the high threshold.

11. The method as claimed in claim 10, wherein said step of generating the gain regulation signal further comprises the sub-steps of:

comparing the atmospheric pressure level with a low threshold if the atmospheric pressure level is lower than the high threshold;

generating a second gain regulation signal for increasing the controllable gain if the atmospheric pressure level is lower than the low threshold.

12. The method as claimed in claim 11, wherein the high threshold and the low threshold are adjustable.

13. A method for regulating the sensitivity of a touch pad, the method comprises the steps of:

receiving analog signals generated by the touch pad;

measuring ambient atmospheric pressure, and generating an atmospheric pressure level;

obtaining a predetermined gain value corresponding to the atmospheric pressure level;

amplifying the analog signals by the predetermined gain value;

converting the amplified analog signals to the digital signals;

determining the touch location according to the digital signals.

14. The method as claimed in claim 13, wherein said step of obtaining the predetermined gain value comprise the sub-steps of:

providing a memory for storing a plurality of gain values corresponding to different atmospheric pressure levels;

searching the memory to obtain the gain value corresponding to the atmospheric pressure level.

* * * * *